Feb. 23, 1937. W. KOWALSKI 2,071,845
BREAD FORM
Filed Dec. 19, 1935 2 Sheets-Sheet 1

INVENTOR.
Waclaw Kowalski
BY
ATTORNEY.

Feb. 23, 1937. W. KOWALSKI 2,071,845
BREAD FORM
Filed Dec. 19, 1935 2 Sheets-Sheet 2

INVENTOR.
Waclaw Kowalski
BY
Cornelius Zubriskie
ATTORNEY.

Patented Feb. 23, 1937

2,071,845

UNITED STATES PATENT OFFICE 2,071,845

BREAD FORM

Waclaw Kowalski, Brooklyn, N. Y.

Application December 19, 1935, Serial No. 55,172

6 Claims. (Cl. 107—7)

This invention is a form adapted to be used by bakers in the making of loaves of bread and more particularly loaves of sweet or sour rye bread.

Heretofore it has been the practice in making bread of this kind to shape the loaves by hand in such manner that the loaf is relatively wide at its middle and tapers gradually toward its opposite ends. The bread, so shaped manually, is thereafter proved and raised and placed in the oven by means of the usual peel. Bread thus baked is of the common and well known form having the characteristic tapered ends and the palatable crust.

From the standpoint of the ultimate consumer bread in this form is thoroughly satisfactory, but with a loaf so shaped, it is practically impossible to slice it in a modern slicing machine. Furthermore, when attempts are made to use such loaves commercially in the making of sandwiches for sale, it is characteristic of these loaves that no two sandwiches are of the same size. The slices of bread taken from the middle of the loaf are large and rotund, while those taken from nearer the end of the loaf are of an appreciably smaller size. As a matter of fact at lunch rooms, cafeterias and the like where sandwiches are sold in quantities, the customers demand that the sandwiches be large and this necessitates that the ends of the loaf be thrown away or used for other purposes. This practice results in very considerable waste and materially increases bread costs in establishments of this kind.

Various attempts have been made to overcome this difficulty and these attempts have been uniformly directed to the production of a loaf of substantially uniform cross section throughout substantially its entire length.

It has, however, heretofore been felt that such a loaf could not be made by hand and that some satisfactory mechanical expedient must enter into the making in order to accomplish the result desired. As a result, there has been developed, and is now used in a limited way, a so-called bread form, wherein the loaves are baked within compartments. These prior forms have been made of metal to withstand the heat of the oven and are made either in the form of casting or sheet metal, so fabricated as to constitute a rectangular frame, the interior of which is divided by rigid, metal partitions into compartments open at their tops and bottoms. The practice has been to place one of these metal forms on a peel, deposit the dough as it comes from the mixer and kneading apparatus in the respective compartments, and thereupon permit the same to prove and raise. Thereafter the peel and form, with the bread within the latter, are introduced into the oven and the peel removed through the use of the conventional hook, leaving the bread in the form within the oven for baking in the form. After baking, the bread and form are removed from the oven and the bread loaves are taken from the form.

The practice described will unquestionably produce loaves of substantially uniform size, but it is open to such serious objections that it has not met with favor. For example, when bread is baked in metal forms as described, it has a pronounced tendency to stick to the forms, and experience has shown a high percentage of damage to the loaves during removal from the forms. Furthermore when bread is baked in metal forms, the presence of the form about four sides of each loaf so shields these sides that they are entirely devoid of the hard crispy crust which is so universally desired by those who like rye bread. In other words, it is impossible to produce in a metal form of the character stated, a rye loaf which will approximate in actual taste and character the old and well known conventional rye loaf.

For these reasons, the problem has not heretofore been solved, and restaurants, cafeterias and lunch rooms are required to continue, in a majority of cases, the use of the tapered ended rye loaf with the consequent waste to which I have referred.

With the foregoing considerations in mind, the primary object of the present invention is to provide loaves of bread which will possess all the characteristics as to palatability, flavor and physical properties of the old and conventional rye loaf, but which will nevertheless be of uniform shape throughout its length, so that slices of bread cut from all parts of the loaf will be of uniform size.

My experimentation and research in connection with the problem described has demonstrated to me that this object may be accomplished in a thoroughly satisfactory and expeditious way through the employment of a bread form which will be hereinafter more fully described.

Speaking generally, however, the bread form of this invention embodies a rectangular frame having therein a plurality of compartments, each in the form of a trough formed from fabric or other flexible material, so mounted in the frame that the fabric troughs will be properly supported from the walls of the frame. In each trough is adapted to be placed kneaded dough, and after the dough has been deposited in the troughs, the dough is properly proved and raised, during which operations, the dough will conform to the sides of the trough which are made straight in a longitudinal direction. The frame is so formed that, after this has been accomplished, a peel may be laid over the upper open tops of the troughs and the assembled form and peel are then inverted. The form is then lifted away from the peel, while the weight of the raised loaves will hold them to the peel. As the form is lifted free, the fabric troughs will readily strip from the loaves leaving them resting on the peel without damage to the loaves. The peel may be thereupon placed in the oven and removed in the usual way leaving the loaves to bake in the manner common to ordinary rye loaves, so that the resulting loaf has all the characteristics of the old and conventional rye loaf, except that it is of uniform shape throughout.

The form of the present invention is of novel and unique construction, the details of which will be hereinafter more fully described, but it is to be noted that one of the outstanding features of this invention consists in the use of the flexible troughs or channels secured at their longitudinal edges to the form frame and adapted to readily strip from the loaves in a manner to preclude damage to the latter.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1:
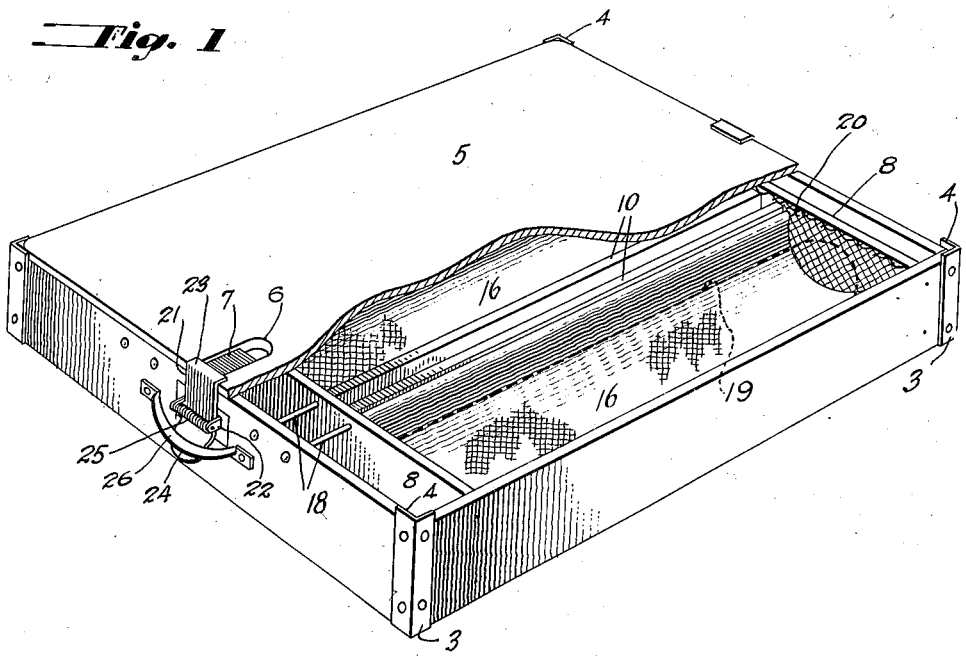
Figure 1 is a perspective view of the bread form of the present invention illustrating the same in its preferred practical embodiment. In this view, a peel is shown as associated with the form and said peel is partially broken away in the interest of clearness.

The frame of the form may be made of any suitable material, such as metal, fibre, wood or the like, but, in practice, I find it convenient and economical to make the frame of wood and it is thus shown in the accompanying drawings. Here the frame is shown as comprising opposite side walls 1 and outer end walls 2 secured at their corners by angle irons 3 which extend above the frame, as indicated at 4, to form centering corners or guides for the peel 5. The peel may be of any conventional form, and, in practice, I prefer to use the usual rectangular ply-wood peel, shown in the drawings, and provided at one end with a cut out 6 across which extends a metal plate 7 adapted to be engaged by the baker's hook, used to insert the peel into and to remove it from the oven.

Spaced from the outer end walls 2 of the frame are inner end walls 8. The spacing of these end walls from the respective ends of the frame may be uniform if desired, but I have shown the spacing at one end of the frame wide enough to clear the cut outs 6 of the peel and at the other end of the frame so wide that the loaves of bread will not be positioned at the direct end of the peel as this would not be desirable. The inner end walls are shown as of wood with their opposite ends butted against the side walls 1 and nailed in place, as indicated at 9.

Figure 3:
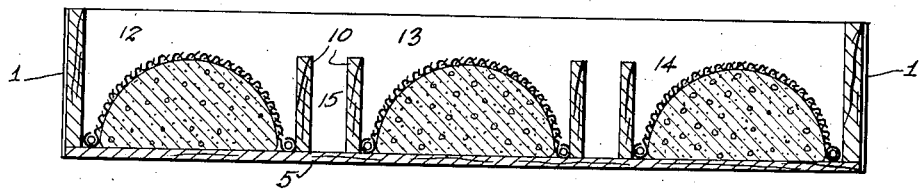
Figure 3 is a transverse section through the assembly taken in the plane of the line 3—3 of Figure 2.
Figure 4:
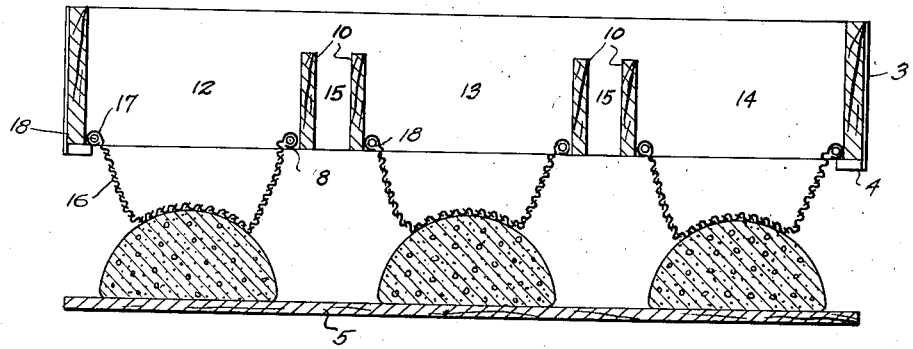
Figure 4 is a view similar to Figure 3, but showing the form as it appears when lifted from the peel.

Between the inner end walls 8 are arranged longitudinal partitions 10. These are also shown as of wood, the opposite ends of the partitions being butted against the walls 8 and held in place by nails 11. These partitions divide the interior of the frame into compartments, shown as three in number and designated 12, 13 and 14. It is desirable, moreover, that adjacent partitions 10 be spaced apart to provide intermediate spaces 15, so that, when the raised loaves are deposited on the peel, they will be spaced apart a sufficient distance to allow of further raising of the loaves without contact with one another. This spacing is clearly shown in Figures 3 and 4.

In each of the compartments 12, 13 and 14 is arranged a fabric trough, shown as a strip of fabric 16, the longitudinal edges of which are returned upon themselves to provide hems 17 properly sewed and through each of these hems is passed a metal supporting rod. The metal supporting rods 18 extend longitudinally along the upper longitudinal edges of the compartments 12, 13 and 14 and pass through all four end walls and are riveted over or provided with heads and nuts to properly anchor them in position. The function of these tie rods is to support the fabric troughs at the upper lateral edges of the latter and they serve the additional purpose of strengthening and reinforcing the frame. It might be possible to tack or otherwise secure the lateral edges of each of these fabric strips directly to the partitions 10 and to the side walls 1, but I find it better practice to mount these fabric troughs on the metal tie rods as described. The fabric troughs may have closed ends sewed thereto, but I find it thoroughly satisfactory to line the inner faces of the inner walls 8 with fabric 20 attached to said end walls and when this is done, it is entirely practical to leave the ends of the fabric troughs unattached, so that they hang loosely. This gives thoroughly satisfactory results and it permits the fabric to more readily strip from the raised loaves, as will be presently described.

In using the form of the present invention, the dough, after coming from the mixing and kneading apparatus, is divided into loaves of an appropriate size and one of these dough loaves, properly floured, is placed in each trough, while the parts are in the relation shown in Figure 1, with the peel removed. One of the dough loaves is indicated at 19 in this figure.

After the dough has been deposited in the several troughs, the frame is placed in the conventional steam box or proving box for proving and raising. After these operations, the frame is removed from the proving box and it will be found that the dough has raised so as to practically fill the fabric trough or channels and conform thereto throughout the length thereof.

The peel 5 is now laid on the top of the frame and partakes of the position shown in Figure 1. It is guided to its seat and into proper registration with the frame by the corner angles 4 and is adapted to be locked in place temporarily by means of spring clips. Each spring clip is shown as comprising a plate 21 pivotally secured to a fixture 22 secured to one of the end walls 2 by screws or the like. One end of the plate is turned at right angles to form a retaining flange 23, while the other end of the plate is bent outwardly to form an operating tongue 24. A spring 25 is coiled about the pivot of the plate and normally serves to urge the retaining flange into a position to engage with the peel 5, as clearly shown in Figure 1. There is a clip associated with each end of the frame and a handle 26 overlies each clip to facilitate efficient operation of the device.

When the peel is positioned on the form as shown in Figure 1, the spring clips are manually retracted to permit the peel to be deposited in place and are then released to lock the peel in position. This having been accomplished, the baker grasps the two handles 26 at the opposite ends of the frame and inverts the assembly, so that it partakes of the position shown in Figure 2 with the peel on the bottom. The functions of the partitions 10 are to restrain the fabric channel or troughs from lateral movement during the inverting of the assembly for if these partitions were not used, there might be a tendency of the fabric troughs to sag laterally and deform the raised loaves. This is undesirable and it is found in practice that the partitions 10 effectually safeguard against this.

Figure 2:
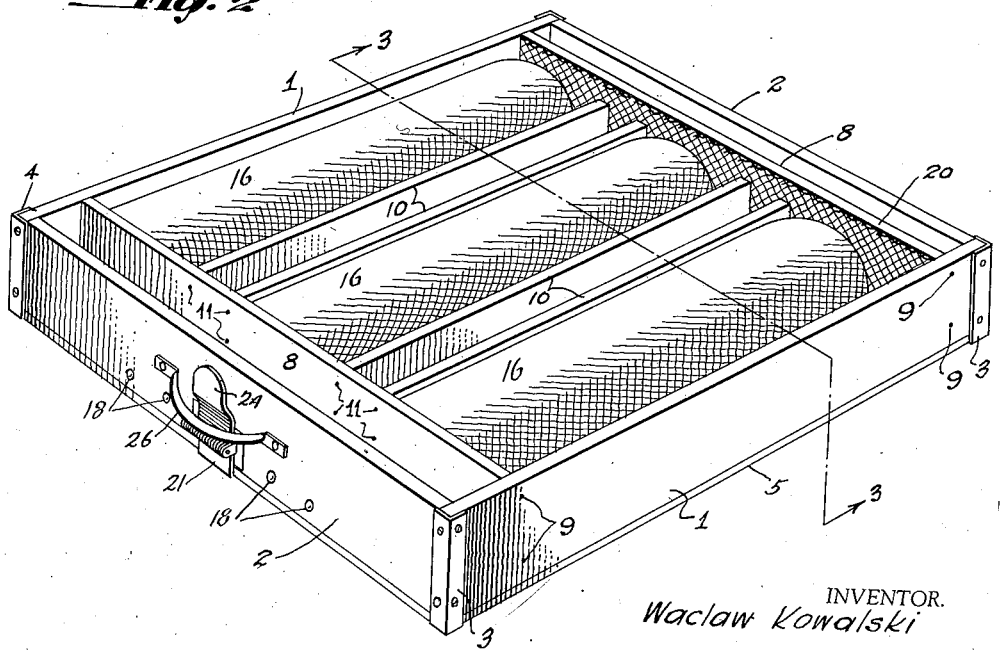
Figure 2 is a view similar to Figure 1, but showing the parts inverted.
Figure 5:
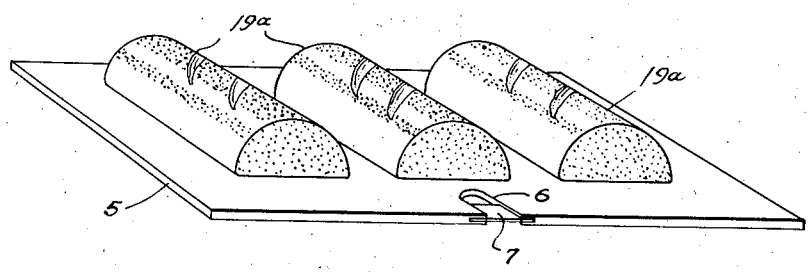
Figure 5 shows the peel with the loaves of bread thereon, ready for the oven.

After the baker has inverted the assembly, and brought it into the position shown in Figure 2, the operating tongues 24 of the spring catches will lie directly beneath the heel of the hands which grasp the handles 26, so that if the heels of the hands are thereupon pressed against these operating tongues 24, the plates 21 will be swung on their pivots to retract the retaining flanges 23 from beneath the peel. The frame may be thereupon lifted, from the position shown in Figures 2 and 3 to remove the frame from the peel. As this operation proceeds, the fabric troughs or channels 16 will be stripped from the raised loaves 19a, as clearly shown in Figure 4, and in such manner as to effectually preclude any possibility of damage to these loaves. As a result, the loaves will be held to the peel by their own weight and will be left in place thereon, as shown in Figure 5. Here the loaves are shown resting on the peel and ready for the oven. By virtue of the lateral spacing of the troughs, the loaves are properly spaced from one another, so that any subsequent enlargement of the loaf due to raising when placed in an oven will not cause them to contact with one another, while the spacing of the inner end walls 8 from the outer end walls 2 will have properly spaced the opposite ends of these loaves from the corresponding edges of the peel.

The conventional hook is thereupon engaged with the strip 7 of the peel and the peel, with the loaves thereon, is introduced into the oven in the usual way, the peel being thereupon immediately removed to leave the loaves in the oven for baking. After the loaves are baked with all sides thereof exposed to the heat of the oven, in the conventional and approved manner of baking the old fashioned rye loaf, they are removed in the usual way and are ready for the market.

Use of the form of this invention for the production of loaves of bread in the manner described has demonstrated beyond question the ability of the same to produce the desired results. Loaves of bread thus made are of uniform cross section throughout and have the desired crust over all of their surfaces. These loaves will produce uniform slices throughout their entire length and their straight sides permit modern slicing machinery to function with complete satisfaction when operating thereon. A further advantage of these loaves is that they are admirably suited for wrapping by automatic machinery, whereas no satisfactory way other than by purely manual operation has ever been devised for wrapping an old fashioned rye loaf, because each loaf is a different size and shape than every other one.

I have shown the bread form of this invention in the accompanying drawings as adapted for the making of three loaves of bread. I may, however, make the form of any desired size and if relatively short or half sized loaves are desired, I may place one or more transverse partitions across the form and thus divide the relatively long fabric troughs into shorter troughs of corresponding number, it being understod that in every case the ends of the trough will be fabric faced for I have found that the dough will not stick to the fabric when properly floured. I have described the use of a fabric, such, for example, as canvas or drill of appropriate strength as I find this gives very satisfactory results and long wear. Any other suitable flexible material to which the dough will not stick may, however, be employed for this purpose without departing from the invention.

The invention has been described in a way in which it is carried out manually, i. e., through the manipulation of the form by hand, yet it will be readily understood that the invention may well be incorporated in automatic bread making machinery without departing from this invention, the scope of which is to be understood as fully commensurate with the appended claims.

I also wish it understood that, while I have described the invention as particularly intended for the use in the making of sweet and sour rye loaves, it may be used for bread of other kinds where predetermined shaping is desired and where a crust is wanted over all sides of the loaf.

Having thus fully described the invention, what I claim as new and desire to secure by Letters Patent is:

1. A bread form embodying a rectangular frame comprising four outer walls and having inner walls spaced from two of the outer walls, partitions rigid with and extending between the inner walls and forming compartments between said partitions and the walls of the frame, a fabric trough suspended within each compartment and extending for the full length of the compartment to receive dough for raising therein and into conformity with the pocket.

2. A bread form embodying a rectangular frame comprising four outer walls and having inner walls spaced from two of the outer walls, partitions rigid with and extending between the inner walls and forming compartments between said partitions and the walls of the frame, tie rods extending longitudinally along the sides of the several compartments, and a fabric trough suspended on the rods and positioned within each compartment to extend for the full length of the latter and receive dough for raising therein and into conformity with said pocket.

3. A bread form embodying a rectangular frame comprising four outer walls and having inner walls spaced from two of the outer walls, partitions rigid with and extending between the inner walls and forming between said partitions and the walls of the frame compartments, tie rods extending longitudinally along the sides of the several compartments and through the inner and outer walls of the frame at the opposite ends of the compartments, and a fabric trough suspended on the rods within each compartment and adapted to receive dough for raising therein and into conformity with said pocket.

4. A bread form embodying a rectangular frame comprising four outer walls and having inner walls spaced from two of the outer walls, partitions rigid with and extending between the inner walls and forming compartments between said partitions and the walls of the frame, a fabric trough suspended within each compartment and extending for the full length of the compartment to receive dough for raising therein and into conformity with the pocket, and upstanding angles at each of the four corners of the frame and projecting above the upper edge of the frame to register a peel with respect to the frame, whereby the inner walls will space the raised dough from the opposite ends of the peel.

5. A bread form embodying a rectangular frame comprising four outer walls and having inner walls spaced from two of the outer walls, partitions rigid with and extending between the inner walls and forming compartments between said partitions and the walls of the frame, a fabric trough suspended within each compartment and extending for the full length of the compartment to receive dough for raising therein and into conformity with the pocket, upstanding angles at each of the four corners of the frame and projecting above the upper edge of the frame to register a peel with respect to the frame, whereby the inner walls will space the raised dough from the opposite ends of the peel, spring clips mounted on the frame and adapted to engage the peel to hold the peel in cooperative relation with the corner angles, and handles on the frame and juxtaposed with respect to the spring clips to permit of the manual operation of the clips to release the peel while the operator grasps the handles.

6. A bread form embodying a rectangular frame provided with a plurality of flexible molds having open tops, means at each of the four corners of the frame and at the open top thereof to centralize a peel adapted to rest on the open top of the frame, spring clips also on the frame adapted to engage with such peel to temporarily lock it to the frame, and handles on the frame juxtaposed with the spring clips to permit of the manual operation of the spring clips to release the peel while the operator grasps the handles.

WACLAW KOWALSKI.